(12) United States Patent
Zhang (10) Patent No.: US 10,938,228 B2
(45) Date of Patent: *Mar. 2, 2021

(54) CHARGING CIRCUIT AND MOBILE TERMINAL (71) Applicant: Guangdong Oppo Mobile Telecommunications Corp., Ltd., Guangdong (CN)

(72) Inventor: Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 406 days.

This patent is subject to a terminal disclaimer.

(21) Appl. No.: 15/371,451

(22) Filed: Dec. 7, 2016

(65) Prior Publication Data
US 2017/0085108 A1 Mar. 23, 2017

Related U.S. Application Data (63) Continuation of application No. PCT/CN2015/080490, filed on Jun. 1, 2015.

(51) Int. Cl.
*H02J 7/00* (2006.01)
*H02M 3/335* (2006.01)
*H02M 3/337* (2006.01)

(52) U.S. Cl.
CPC .............. *H02J 7/0068* (2013.01); *H02J 7/00* (2013.01); *H02M 3/3376* (2013.01); *H02M 3/33523* (2013.01); *H02M 3/33576* (2013.01)

(58) Field of Classification Search
CPC ..................................................... H02J 7/0052
USPC .......................................................... 320/107
See application file for complete search history.

(56) References Cited

U.S. PATENT DOCUMENTS

| 6,362,979 | B1 | 3/2002 | Gucyski | |
| 10,148,127 | B2* | 12/2018 | Bae | H02J 17/00 |
| 2002/0110013 | A1* | 8/2002 | Park | H01F 27/2804 |
| | | | | 363/153 |
| 2004/0189251 | A1 | 9/2004 | Kutkut et al. | |
| 2004/0218406 | A1* | 11/2004 | Jang | H02J 5/005 |
| | | | | 363/37 |
| 2007/0210748 | A1 | 9/2007 | Unkrich et al. | |
| 2009/0261778 | A1* | 10/2009 | Kook | H02J 7/0044 |
| | | | | 320/108 |
| 2011/0305043 | A1 | 12/2011 | Matsumoto | |
| 2012/0002446 | A1 | 1/2012 | Madawala | |

(Continued)

FOREIGN PATENT DOCUMENTS

| CL | 201700720 A1 | 8/2017 |
| CN | 201708573 U | 1/2011 |

(Continued)

OTHER PUBLICATIONS

Extended European search report issued in corresponding European application No. 15893545.2 dated Apr. 30, 2018.

(Continued)

*Primary Examiner* — Richard Isla (57) ABSTRACT

It is provided a charging circuit and a mobile terminal. The charging circuit is configured to electrically couple a charging interface and a battery of a terminal, and includes a first circuit, a magnetic coupling element, and a second circuit connected in series.

15 Claims, 6 Drawing Sheets

(56) References Cited

U.S. PATENT DOCUMENTS

| | | |
|---|---|---|
| 2013/0301308 A1 | 11/2013 | Hosotani |
| 2013/0320759 A1 | 12/2013 | Abe |
| 2014/0368167 A1* | 12/2014 | Okura .................... H02J 5/005 320/109 |
| 2015/0249393 A1* | 9/2015 | Zhang ............... H02M 3/33523 363/21.15 |
| 2015/0311806 A1* | 10/2015 | Kim .................. H02M 3/33507 363/21.17 |
| 2015/0333634 A1* | 11/2015 | Yoshida ............ H02M 3/33576 363/21.03 |
| 2016/0094131 A1 | 3/2016 | Baurle et al. |
| 2016/0261123 A1* | 9/2016 | Rapp ................... B60L 11/1812 |
| 2016/0308452 A1* | 10/2016 | Motoki ............. H02M 3/33523 |
| 2016/0359340 A1 | 12/2016 | Zhao et al. |
| 2017/0018965 A1 | 1/2017 | Lee et al. |

FOREIGN PATENT DOCUMENTS

| | | | |
|---|---|---|---|
| CN | 201868097 U | | 6/2011 |
| CN | 201869007 U | | 6/2011 |
| CN | 201869097 | * | 6/2011 |
| CN | 201869097 U | | 6/2011 |
| CN | 202231473 U | | 5/2012 |
| CN | 103872728 A | | 6/2014 |
| CN | 103975497 A | | 8/2014 |
| CN | 104065147 A | | 9/2014 |
| CN | 104393358 A | | 3/2015 |
| CN | 104600796 A | | 5/2015 |
| JP | 2007336710 A | | 12/2007 |
| JP | 2009-247142 A | | 10/2009 |
| JP | 2011-155799 A | | 8/2011 |
| JP | 3169916 U | | 8/2011 |
| JP | 2012-110211 A | | 6/2012 |
| JP | 2013253809 A | | 12/2013 |
| JP | 2014003753 A | | 1/2014 |
| KR | 20100085832 A | | 7/2010 |
| TW | 201351836 A | | 12/2013 |
| TW | 201517455 A | | 5/2015 |
| WO | 2012160660 A1 | | 11/2012 |
| WO | 2013160960 A1 | | 10/2013 |
| WO | 2014103105 A1 | | 7/2014 |
| WO | 2014119871 A1 | | 8/2014 |

OTHER PUBLICATIONS

Australian examination report issued in corresponding Australian application No. 2015397725 dated Feb. 23, 2018.

Office Action 1 issued in corresponding CA application No. 2960419 dated Jan. 18, 2018.

Substantive Examination Report (Paper No. 7) issued in corresponding Philippines application No. 1-2017-500896 dated Sep. 6, 2019.

Office Action issued in corresponding VN application No. 1-2017-00882 dated Sep. 30, 2019.

English translation of Office Action warning of rejection issued in corresponding Chile application No. 201700719 dated Apr. 16, 2020.

Communication pursuant to Article 94(3) EPC issued in corresponding European application No. 15893545.2 dated Nov. 12, 2020.

Office action issued in corresponding Ph application No. 1/2017/500896 dated Nov. 18, 2020.

* cited by examiner

CHARGING CIRCUIT AND MOBILE TERMINAL

CROSS-REFERENCE TO RELATED APPLICATION

This application is a continuation of International Application No. PCT/CN2015/080490, entitled "CHARGING CIRCUIT AND MOBILE TERMINAL", filed on Jun. 1, 2015, which disclosure is herein incorporated by reference.

TECHNICAL FIELD

The present disclosure relates to mobile terminal field, and particularly to a charging circuit and a mobile terminal.

BACKGROUND

With the growing popularity of mobile terminal use, terminal charging has become a focused issue of mobile terminal providers.

SUMMARY

Disclosed herein are implementations of a charging circuit, configured to electrically couple a charging interface and a battery, comprising a first circuit, a magnetic coupling element, and a second circuit connected in series, wherein the first circuit is configured to receive a first current from the charging interface and convert the first current to a second current with at least one of a changed magnitude and a changed direction, the magnetic coupling element comprises a first coil and a second coil, the first coil connecting with the first circuit, the second coil connecting with the second circuit, the first coil and the second coil separated from each other to disconnect a direct-current (DC) path of the charging circuit, the magnetic coupling element is configured to transfer energy from the first coil to the second coil in an electromagnetic induction manner by utilizing the second current with the at least one of the changed magnitude and the changed direction to generate a third current, and the second circuit is configured to adjust the third current to a fourth current suitable for battery charging to charge the battery.

Disclosed herein are also implementations of a mobile terminal, comprising a charging interface, a battery, and a charging circuit arranged between the charging interface and the battery, wherein the charging circuit comprises a first circuit, a magnetic coupling element, and a second circuit connected in series successively between the charging interface and the battery, the first circuit is configured to receive a first current from the charging interface and convert the first current to a second current with at least one of a changed magnitude and a changed direction, the magnetic coupling element comprises a first coil and a second coil, the first coil connecting with the first circuit, the second coil connecting with the second circuit, the first coil and the second coil separated from each other to disconnect a direct-current (DC) path of the charging circuit, the magnetic coupling element is configured to transfer energy from the first coil to the second coil in an electromagnetic induction manner by utilizing the second current with the at least one of the changed magnitude and the changed direction to generate a third current, and the second circuit is configured to adjust the third current to a fourth current suitable for battery charging to charge the battery.

Disclosed herein are also implementations of a charging circuit, comprising a first circuit, a magnetic coupling element, and a second circuit connected in series, the magnetic coupling element comprising a first coil and a second coil, the first coil connecting with the first circuit, the second coil connecting with the second circuit, the first coil and the second coil being separated from each other to disconnect a direct-current (DC) path of the charging circuit.

BRIEF DESCRIPTION OF THE DRAWINGS

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

DETAILED DESCRIPTION

Figure 1:
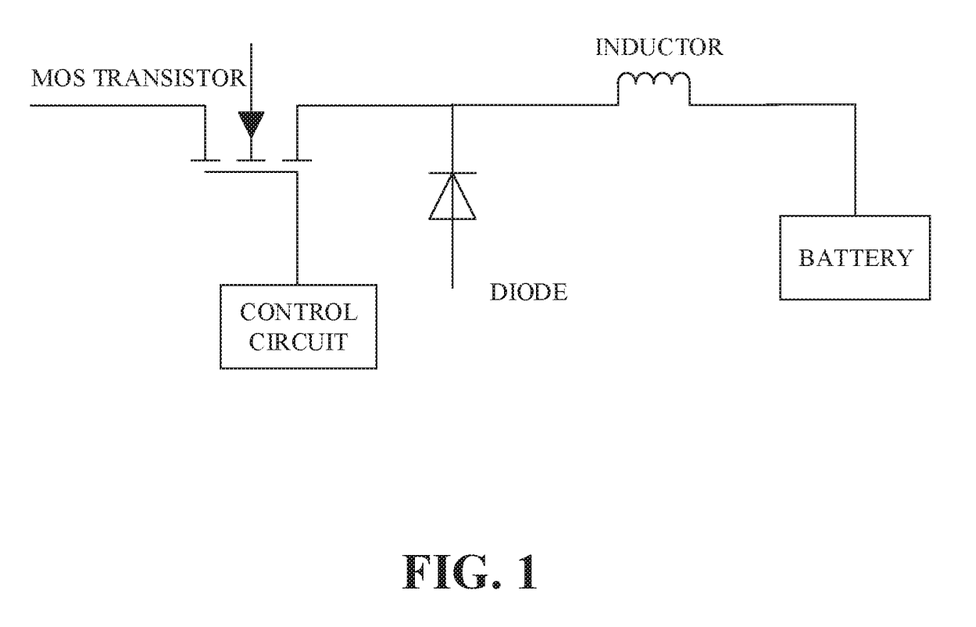
FIG. 1 is a circuit diagram illustrating a charging circuit.

FIG. 1 is a circuit diagram illustrating a charging circuit used in a mobile terminal. This charging circuit is known as BUCK circuit, which includes a MOS transistor, a control circuit, a diode, an inductor, and a battery. Upon charging, the control circuit controls the MOS transistor to turn-on/turn-off to generate a changing square wave current. The square wave current flows to the inductor from the MOS transistor, and then flows to the battery after voltage stabilization conducted by the inductor.

The above mentioned charging process has a risk of MOS transistor breakdown. Upon MOS transistor breakdown, the current will flow through the inductor, a current/voltage detecting circuit, and the battery directly; this will cause the battery to exceed a limit voltage and may even lead to more serious consequences.

The cause of the damage to the MOS transistor can be as follows.

The MOS transistor is mis-energized; the voltage at both ends of the MOS transistor exceeds a maximum voltage that can be withstood; electrostatic breakdown or surge.

The MOS transistor is of poor quality; or, there is an integrated manufacture technology issue.

There can be other defects.

In order to avoid the above problems and improve the reliability of the MOS transistor, the value of on-resistance (RDSON) of the MOS transistor has been increased so as to improve the voltage resistance of the MOS transistor. On the other hand, high resistance, in turn, would cause the charging circuit to be easy to heat, low energy transmission efficiency and so on.

Technical solutions of the implementations of the present disclosure will be described clearly and completely taken in conjunction with the accompanying drawings; it will be apparent to one of ordinary skill in the art that, the implementations described below are merely a part of the disclosure and other implementations obtained out of them without creative work will fall into the protection range of the present disclosure either.

Implementation 1

According to implementation 1 of the present disclosure, it provides a charging circuit. In the following, the components of the charging circuit will be described in detail. A person skilled in the art will be able to arrange or assemble the charging circuit in accordance teaching of the description by using routine methods of experimentation or analysis without undue efforts. Any method used to assemble the charging circuit of the present disclosure will fall into the protection scope defined by the appending claims.

Figure 2:
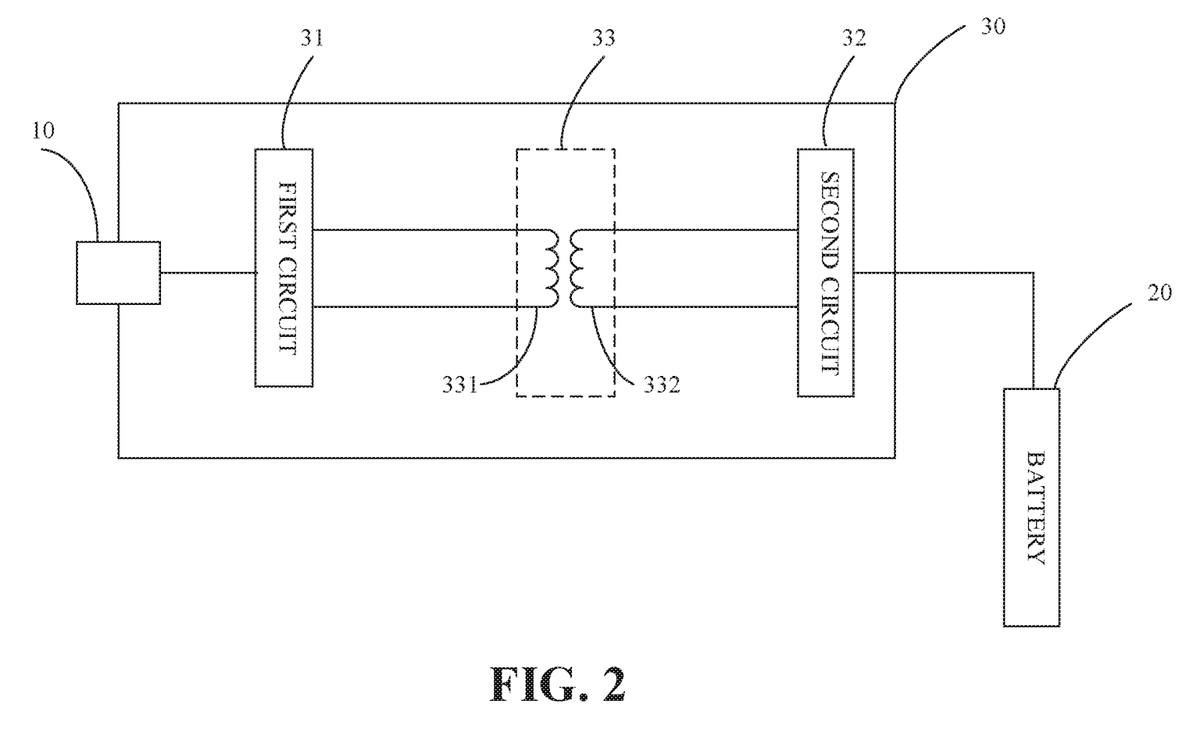
FIG. 2 is a block schematic diagram illustrating a charging circuit according to an implementation of the present disclosure.

FIG. 2 is block schematic diagram illustrating the charging circuit. As shown in FIG. 2, a charging circuit 30 is arranged between a charging interface 10 and a battery 20 of a terminal for electrically coupling the charging interface 10 and the battery 20. The charging circuit 30 includes a first circuit 31, a magnetic coupling element 33, and a second circuit 32 connected in series successively between the charging interface 10 and the battery 20. The magnetic coupling element 33 includes a first coil 331 and a second coil 332. The first coil 331 connects with the first circuit 31, and the second coil 332 connects with the second circuit 32, the first coil 331 and the second coil 332 separated apart from each other so as to disconnect a direct-current (DC) path of the charging circuit 30.

Configurations and operations of the components of the charging circuit will be described in detail below.

The first circuit 31 is configured to receive a first current from the charging interface 10 and convert the first current to a second current with changed magnitude and/or direction.

The magnetic coupling element 33 is configured to transfer energy from the first coil 331 to the second coil 332 in an electromagnetic induction manner by utilizing the second current with changed magnitude and/or direction, so as to generate a third current (in other words, the third current is generated at the second coil 332 and is output to the second circuit 32).

The second circuit 32 is configured to adjust alternating current (AC), which is coupled to the second circuit 32 by the first circuit 31 through the magnetic coupling element 33, to DC which is suitable for battery charging.

In this technical scheme, a DC path of the charging circuit is separated by the magnetic coupling element. That is to say, there is no DC path in the charging circuit. DC current from the charging interface would not be output directly to the second circuit and the battery upon failure of the first circuit, whereby reliability of the charging circuit is improved.

Example 1

Figure 3:
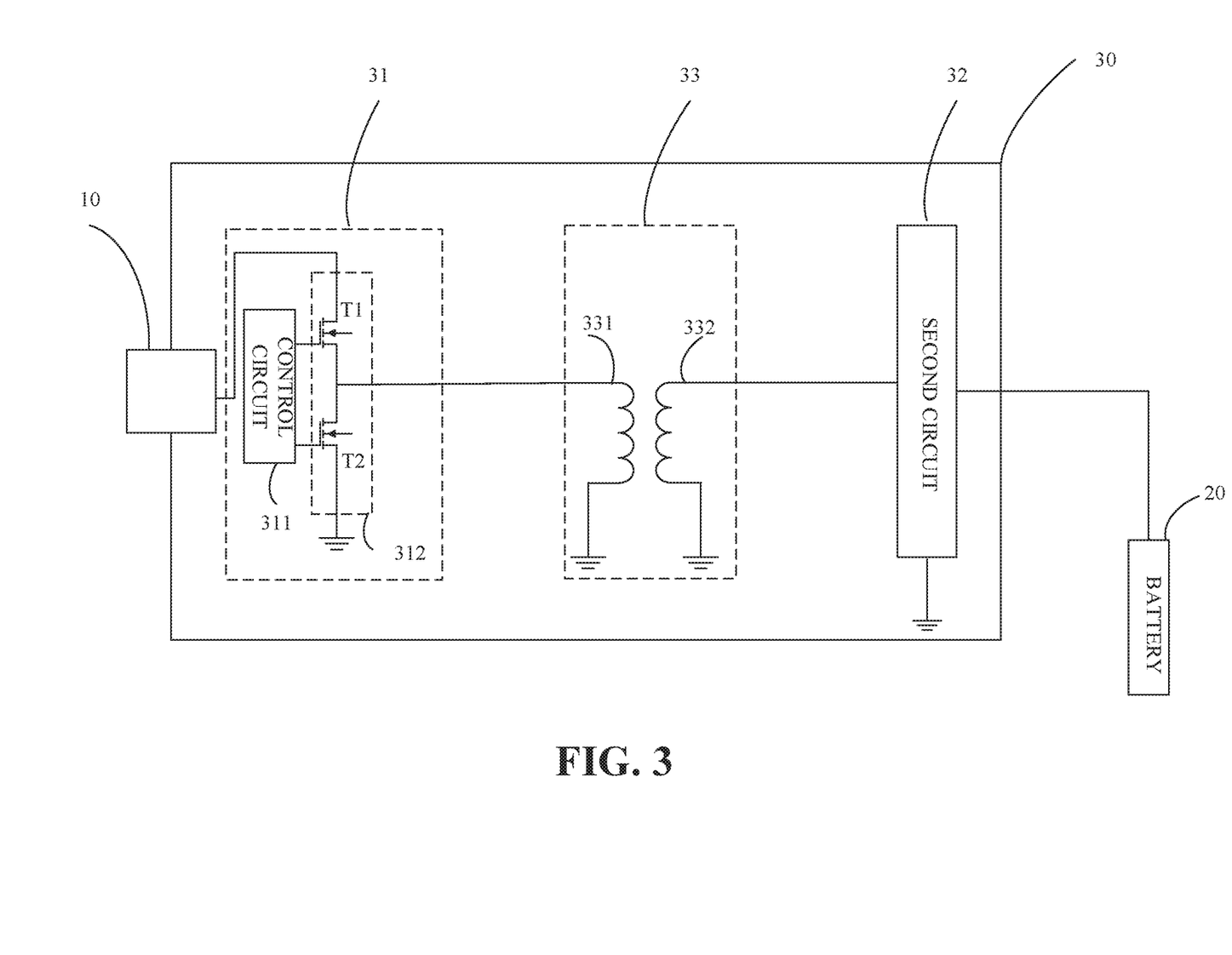
FIG. 3 is a circuit diagram illustrating a charging circuit according to an example of the present disclosure.

FIG. 3 is a circuit diagram illustrating a charging circuit according to Example 1. As shown in FIG. 3, the first circuit 31 includes a half-bridge circuit 312 and a control circuit 311 controlling the half-bridge circuit. With the aid of the half-bridge circuit 312, efficiency of the whole circuit can be improved.

The half-bridge circuit 312 includes a first switch transistor T1 and a second switch transistor T2. A first end of the first switch transistor T1 connects with the charging interface 10, a second end of the first switch transistor T1 connects with a first end of the first coil 331, and a control end of the first switch transistor T1 connects with the control circuit 311. A first end of the second switch transistor T2 connects with the second end of the first switch transistor T1, a second end of the second switch transistor T2 connects to ground, and a control end of the second switch transistor T2 connects to the control circuit 311. A second end of the first coil 331 connects to ground. Furthermore, two ends of the second coil 332 can connect with the second circuit 32 and ground respectively. Besides, the second circuit 32 can be grounded.

Typically, a switch transistor (such as a MOS transistor), which is easy breakdown, is arranged within the first circuit. When breakdown of the switch transistor occurs, the first circuit could not convert DC to AC via the switch transistor; this cause DC input at the charging interface being applied to a subsequent component of the charging interface or a battery directly. However, in this example, with the aid of the magnetic coupling element arranged between the first circuit and the second circuit, a DC path of the charging circuit can be disconnected. That is to say, DC input at the charging interface cannot flow to the second circuit or the battery even if the switch transistor in the first circuit is broke down or failure, whereby the reliability of the charging circuit of the mobile terminal can be improved.

In addition, the magnetic coupling element has good isolation performance. Thus, instead of increasing the on-resistance so as to increase the voltage resistance of the MOS transistor and then improve the reliability of the circuit like in the prior art, in implementations of the present disclosure, a lower on-resistance of the switch transistor in the first circuit is allowed, and this will improve the energy transfer efficiency of the whole charging circuit while reducing heating and loss.

Example 2

Figure 4:
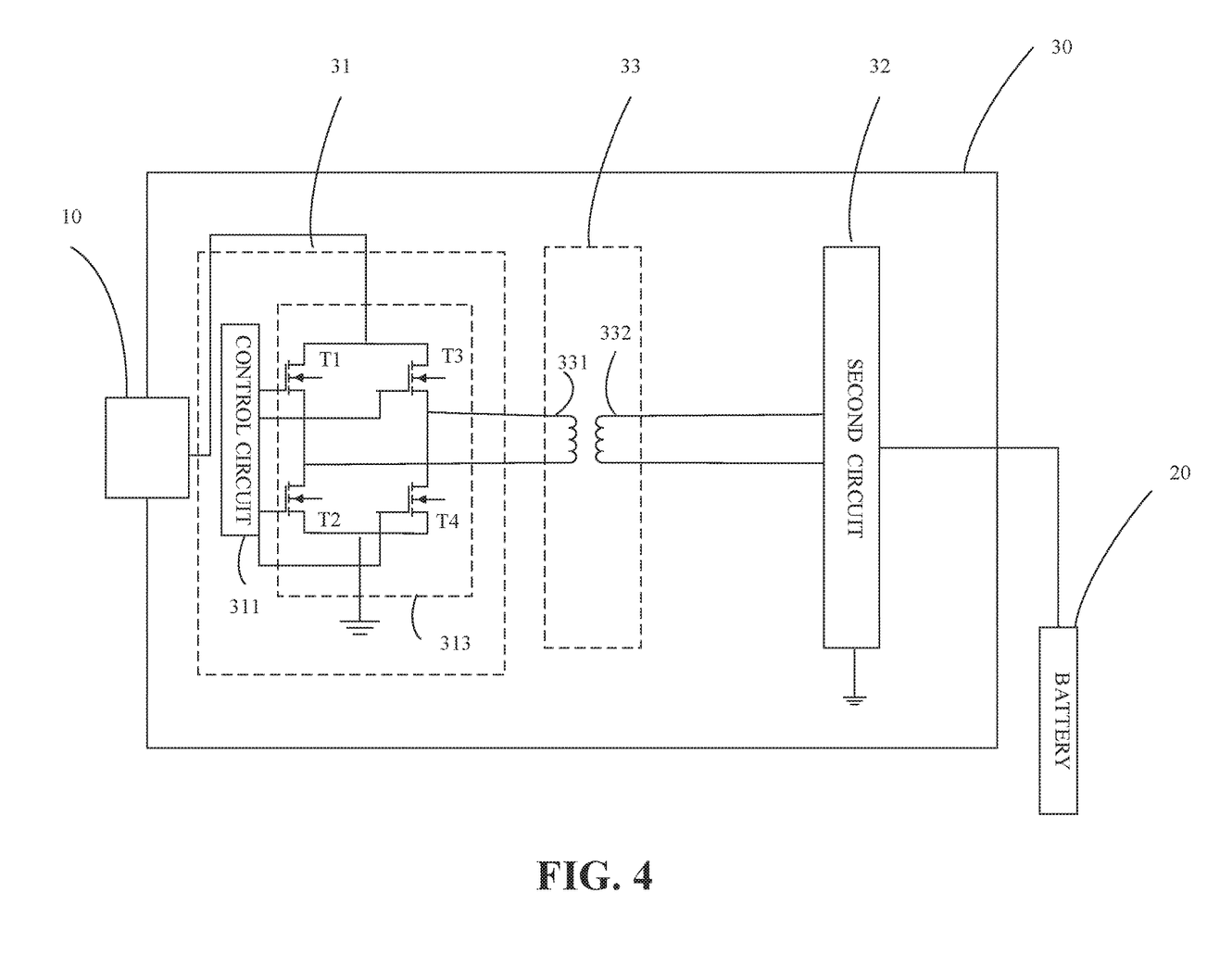
FIG. 4 is a circuit diagram illustrating a charging circuit according to an example of the present disclosure.

FIG. 4 is a circuit diagram illustrating a charging circuit according to Example 2. As shown in FIG. 4, the first circuit 31 includes a full-bridge circuit 313 and a control circuit 311 controlling the full-bridge circuit. A difference between example 1 and example 2 is that, in example 2, the full-bridge circuit 313 is used to replace the half-bridge circuit 312 in example 1. With the aid of the full-bridge circuit 313, efficiency of the whole circuit can be further improved.

The full-bridge circuit 313 includes a first switch transistor T1, a second switch transistor T2, a third switch transistor T3, and a fourth switch transistor T4. A first end of the first switch transistor T1 connects with the charging interface 10, a second end of the first switch transistor T1 connects with a second end of the first coil 331, and a control end of the first switch transistor T1 connects with the control circuit 311. A first end of the second switch transistor T2 connects with the second end of the first switch transistor T1, a second end of the second switch transistor T2 connects to ground, and a control end of the second switch transistor T2 connects with the control circuit 311. A first end of the third switch transistor T3 connects with the charging interface 10, a second end of the third switch transistor T3 connects with the first end of the first coil 331, and a control end of the third switch transistor T3 connects with the control circuit 311. A first end of the fourth switch transistor T4 connects with the second end of the third switch transistor T3, a second end of the fourth switch transistor T4 connects to ground, and a control end of the fourth switch transistor T4 connects with the control circuit 311. In addition, two ends of the second coil 332 can connect with the second circuit 32, and the second circuit can be grounded.

A switch transistor (such as a MOS transistor), which is easy breakdown, is arranged within the first circuit. When breakdown of the switch transistor occurs, the first circuit could not convert DC to AC via the switch transistor; this cause DC input at the charging interface being applied to a subsequent component of the charging interface or a battery directly. However, in this example, with the aid of the magnetic coupling element arranged between the first circuit and the second circuit, a DC path of the charging circuit can be disconnected. That is to say, DC input at the charging interface cannot flow to the second circuit or the battery even if the switch transistor in the first circuit is broke down or failure, whereby the reliability of the charging circuit of the mobile terminal can be improved.

In addition, the magnetic coupling element has good isolation performance. Thus, instead of increasing the on-resistance so as to increase the voltage resistance of the MOS transistor and then improve the reliability of the circuit like in the prior art, in implementations of the present disclosure, a lower on-resistance of the switch transistor in the first circuit is allowed, and this will improve the energy transfer efficiency of the whole charging circuit while reducing heating and loss.

Example 3

Figure 5:
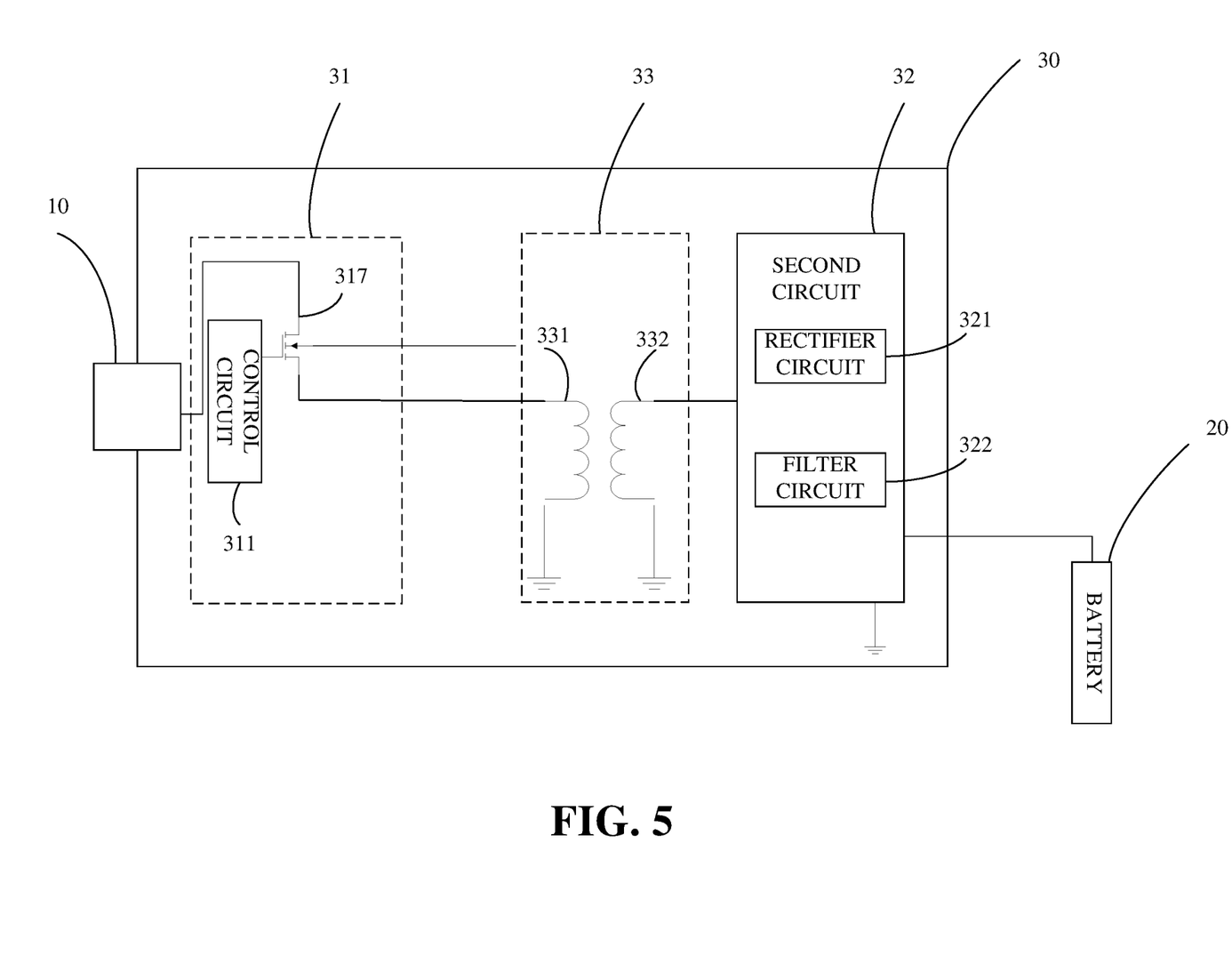
FIG. 5 is a circuit diagram illustrating a charging circuit according to an example of the present disclosure.

FIG. 5 is a circuit diagram illustrating a charging circuit according to Example 3. As shown in FIG. 5, the first circuit 31 includes a switch transistor 317 and a control circuit 311 controlling the switch transistor. A difference between example 3 and example 1-2 is that, in example 3, a switch transistor is used to replace the half-bridge circuit/full bridge circuit, whereby the cost of the circuit can be reduced.

A first end of the switch transistor 317 connects with the charging interface 10, a second end of the switch transistor 317 connects with a first end of the first coil 331, and a control end of the switch transistor 317 connects with the control circuit 311. A second end of the first coil 331 connects to ground.

In short, as can be seen from the above description, technical schemes of the implementations of the present disclosure can improve the reliability of the charging circuit through a minor modification to the related art.

The switch transistor in the first circuit referred to herein includes multiple metal oxide semiconductor field effect transistors (MOSFET).

As an implementation, the second circuit 32 referred to herein can include a rectifier circuit 321 and a filter circuit 322.

Implementation 2

Figure 6:
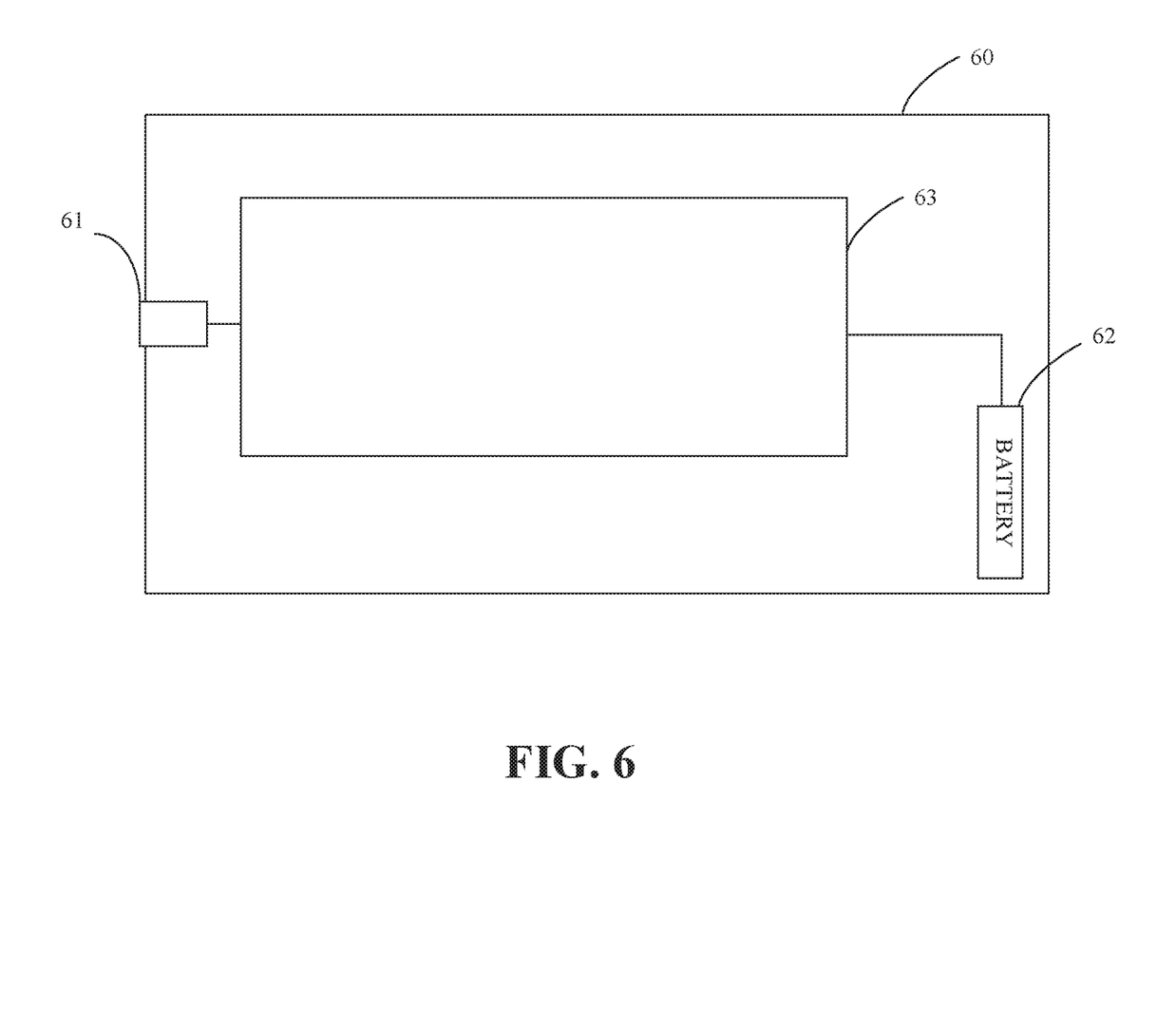
FIG. 6 is a block schematic diagram illustrating a mobile terminal according to an implementation of the present disclosure.

According to Implementation 2 of the present disclosure, it is provided a mobile terminal. FIG. 6 is a block schematic diagram illustrating the mobile terminal. As shown in FIG. 6, a mobile terminal 60 includes a charging interface 61, a battery 62, and a charging circuit 63. The charging circuit 63 can adopt any of the implementations of the charging circuit 30 described above.

For details of the charging circuit 63, please refer to the charging circuit 30 described above with refer to FIG. 2-FIG. 5, and it will not be described here again in order to avoid redundancy.

In the technical scheme described above, a DC path of the charging circuit is separated by the magnetic coupling element. That is to say, there is no DC path in the charging circuit. DC current from the charging interface would not be output directly to the second circuit and the battery upon failure of the first circuit, whereby reliability of the charging circuit is improved.

As an implementation, the charging interface 51 is a USB interface or any other interface corresponds to related industry standards of terminal charging interface.

As an implementation, the battery 20 is lithium battery.

As an implementation, the mobile terminal 50 supports a normal charging mode and a fast charging mode, wherein charging current is larger in the fast charging mode than in the normal charging mode.

It should be understood that the phenomenon of MOS transistor breakdown is particularly serious in the mobile terminal which supports fast charging. As to the problem of circuit unreliability upon fast charging caused by MOS transistor breakdown, the mobile terminal according to the implementation of the present disclosure can be a good solution.

A person skilled in the art will understand, exemplary units or algorithm steps described in any of the implementations can be achieved via electronic hardware or a combination of electronic hardware and computer software. Whether hardware or software should be adopted depends on design constraints and specific applications of the technical schemes. Respective specific application can use different methods or manners to achieve the function described in the implementations, which will fall into the protection scope of the present disclosure.

Specific operations of the device, system, and the unit or module can cross-refer to corresponding descriptions according to the implementation, and will not go into much detail here.

In the implementations of the present disclosure, the device and system described herein can be achieved in other manners. The configuration of the device according to the implementation described above is only exemplary; the division of units in the device is a kind of division according to logical function, therefore there can be other divisions in practice. For example, multiple units or components can be combined or integrated into another system; or, some features can be ignored while some units need not to be executed. On the other hand, various function units can be integrated into one processing unit; two or more than two units can be integrated into one unit; or, each unit is physically separate.

Furthermore, various function units can be integrated into one processing unit; two or more than two units can be integrated into one unit; or, each unit is physically separate.

Operations or functions of technical schemes according to the implementations of the present disclosure, when achieved in the form of software functional units and sold or used as an independent product, can be stored in a computer readable storage medium. According to this, all or a part of the technical schemes of the present disclosure can be realized in the form of software products which can be stored in a storage medium. The storage medium includes USB disk, Read Only Memory (ROM), Random Access Memory (RAM), magnetic disk, CD, and any other medium that can be configured to store computer-readable program code or instructions. The computer-readable program code, when executed on a data-processing apparatus (can be personal computer, server, or network equipment), adapted to perform all or a part of the methods described in the above-mentioned implementations.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A charging circuit, configured to electrically couple a charging interface of a mobile terminal and a battery of the same mobile terminal, the charging circuit comprising a first circuit, a magnetic coupling element, and a second circuit connected in series between the charging interface and the battery,
   wherein the mobile terminal supports a normal charging mode and a fast charging mode, and charging current is larger in the fast charging mode than in the normal charging mode;
   wherein the first circuit is configured to receive a first current from the charging interface and convert the first current to a second current with at least one of a changed magnitude and a changed direction, wherein the charging interface is a universal serial bus (USB) interface;
   wherein the magnetic coupling element comprises a first coil and a second coil, the first coil connecting with the first circuit, the second coil connecting with the second circuit, the first coil and the second coil separated from each other to disconnect a direct-current (DC) path of the charging circuit;
   wherein the magnetic coupling element is configured to transfer energy from the first coil to the second coil in an electromagnetic induction manner by utilizing the second current with the at least one of the changed magnitude and the changed direction to generate a third current;
   wherein the second circuit is configured to adjust the third current to a fourth current suitable for battery charging to charge the battery; and
   wherein the first circuit comprises at least one transistor having an on-resistance, wherein the on-resistance has a first value when a voltage resistance of the at least one transistor is increased, wherein the on-resistance has a second value when the voltage resistance of the at least one transistor is not increased, wherein the second value is less than the first value;
   wherein the first circuit comprises a half-bridge circuit and a control circuit controlling the half-bridge circuit, and the half-bridge circuit comprises a first switch transistor and a second switch transistor, wherein
      the first switch transistor has a first end configured to connect with the charging interface, a second end connected with a first end of the first coil, and a control end connected with the control circuit;
      the second switch transistor has a first end connected with the second end of the first switch transistor, a second end configured to connect to ground, and a control end connected with the control circuit; and
      the first coil has a second end configured to connect to ground.

2. The charging circuit of claim 1, wherein the first circuit comprises a half-bridge circuit and a control circuit controlling the half-bridge circuit, and the half-bridge circuit comprises a first switch transistor and a second switch transistor, wherein
   the first switch transistor has a first end configured to connect with the charging interface, a second end connected with a first end of the first coil, and a control end connected with the control circuit;
   the second switch transistor has a first end connected with the second end of the first switch transistor, a second end configured to connect to ground, and a control end connected with the control circuit; and
   the first coil has a second end configured to connect to ground.

3. The charging circuit of claim 1, wherein the first circuit comprises a full-bridge circuit and a control circuit controlling the full-bridge circuit, and the full-bridge circuit comprises a first switch transistor, a second switch transistor, a third switch transistor, and a fourth switch transistor, wherein
   the first switch transistor has a first end configured to connect with the charging interface, a second end connected with a second end of the first coil, and a control end connected with the control circuit;
   the second switch transistor has a first end connected with the second end of the first switch transistor, a second end configured to connect to ground, and a control end connected with the control circuit;
   the third switch transistor has a first end configured to connect with the charging interface, a second end connected with a first end of the first coil, and a control end connected with the control circuit; and
   the fourth switch transistor has a first end connected with the second end of the third switch transistor, a second end configured to connect to ground, and a control end connected with the control circuit.

4. The charging circuit of claim 1, wherein
   the first circuit comprises a switch transistor and a control circuit controlling the switch transistor;
   the switch transistor has a first end configured to connect with the charging interface, a second end connected with a first end of the first coil, and a control end connected with the control circuit; and
   the first coil has a second end configured to connect to ground.

5. The charging circuit of claim 4, wherein the switch transistor in the first circuit is metal oxide semiconductor field effect transistor (MOSFET).

6. The charging circuit of claim 1, wherein the second circuit comprises a rectifier circuit and a filter circuit.

7. A mobile terminal comprising a charging interface, a battery, and a charging circuit arranged between the charging interface and the battery,
   wherein the charging circuit comprises a first circuit, a magnetic coupling element, and a second circuit connected in series successively between the charging interface and the battery;
   wherein the first circuit is configured to receive a first current from the charging interface and convert the first current to a second current with at least one of a changed magnitude and a changed direction, wherein the charging interface is a universal serial bus (USB) interface;
   wherein the magnetic coupling element comprises a first coil and a second coil, the first coil connecting with the first circuit, the second coil connecting with the second circuit, the first coil and the second coil separated from each other to disconnect a direct-current (DC) path of the charging circuit;
   wherein the magnetic coupling element is configured to transfer energy from the first coil to the second coil in an electromagnetic induction manner by utilizing the second current with the at least one of the changed magnitude and the changed direction to generate a third current;

wherein the second circuit is configured to adjust the third current to a fourth current suitable for battery charging to charge the battery;

wherein the first circuit comprises at least one transistor having an on-resistance, wherein the on-resistance has a first value when a voltage resistance of the at least one transistor is increased, wherein the on-resistance has a second value when the voltage resistance of the at least one transistor is not increased, wherein the second value is less than the first value; and wherein the mobile terminal supports a normal charging mode and a fast charging mode, and charging current is larger in the fast charging mode than in the normal charging mode;

wherein the first circuit comprises a half-bridge circuit and a control circuit controlling the half-bridge circuit, and the half-bridge circuit comprises a first switch transistor and a second switch transistor, wherein the first switch transistor has a first end connected with the charging interface, a second end connected with a first end of the first coil, and a control end connected with the control circuit;

the second switch transistor has a first end connected with the second end of the first switch transistor, a second end configured to connect to ground, and a control end connected with the control circuit; and the first coil has a second end configured to connect to ground.

8. The mobile terminal of claim 7, wherein the first circuit comprises a half-bridge circuit and a control circuit controlling the half-bridge circuit, and the half-bridge circuit comprises a first switch transistor and a second switch transistor, wherein the first switch transistor has a first end connected with the charging interface, a second end connected with a first end of the first coil, and a control end connected with the control circuit;

the second switch transistor has a first end connected with the second end of the first switch transistor, a second end configured to connect to ground, and a control end connected with the control circuit; and the first coil has a second end configured to connect to ground.

9. The mobile terminal of claim 7, wherein the first circuit comprises a full-bridge circuit and a control circuit controlling the full-bridge circuit, and the full-bridge circuit comprises a first switch transistor, a second switch transistor, a third switch transistor, and a fourth switch transistor, wherein the first switch transistor has a first end connected with the charging interface, a second end connected with a second end of the first coil, and a control end connected with the control circuit;

the second switch transistor has a first end connected with the second end of the first switch transistor, a second end configured to connect to ground, and a control end connected with the control circuit;

the third switch transistor has a first end connected with the charging interface, a second end connected with a first end of the first coil, and a control end connected with the control circuit; and the fourth switch transistor has a first end connected with the second end of the third switch transistor, a second end configured to connect to ground, and a control end connected with the control circuit.

10. The mobile terminal of claim 7, wherein the first circuit comprises a switch transistor and a control circuit controlling the switch transistor;

the switch transistor has a first end connected with the charging interface, a second end connected with a first end of the first coil, and a control end connected with the control circuit; and the first coil has a second end configured to connect to ground.

11. The mobile terminal of claim 7, wherein the battery is a lithium battery.

12. A charging circuit comprising a first circuit, a magnetic coupling element, and a second circuit connected in series between a charging interface of a mobile terminal and a battery of the same mobile terminal, the magnetic coupling element comprising a first coil and a second coil, the first coil connecting with the first circuit, the second coil connecting with the second circuit, the first coil and the second coil being separated from each other to disconnect a direct-current (DC) path of the charging circuit, wherein the charging interface is a universal serial bus (USB) interface, wherein the mobile terminal supports a normal charging mode and a fast charging mode, and charging current is larger in the fast charging mode than in the normal charging mode; and wherein the first circuit comprises at least one transistor having an on-resistance, wherein the on-resistance has a first value when a voltage resistance of the at least one transistor is increased, wherein the on-resistance has a second value when the voltage resistance of the at least one transistor is not increased, wherein the second value is less than the first value;

wherein the first circuit comprises a half-bridge circuit and a control circuit controlling the half-bridge circuit, and the half-bridge circuit comprises a first switch transistor and a second switch transistor, wherein the first switch transistor has a first end configured to connect with the charging interface, a second end connected with a first end of the first coil, and a control end connected with the control circuit;

the second switch transistor has a first end connected with the second end of the first switch transistor, a second end configured to connect to ground, and a control end connected with the control circuit; and the first coil has a second end configured to connect to ground.

13. The charging circuit of claim 12, wherein the first circuit comprises a half-bridge circuit and a control circuit controlling the half-bridge circuit, and the half-bridge circuit comprises a first switch transistor and a second switch transistor, wherein the first switch transistor has a first end configured to connect with the charging interface, a second end connected with a first end of the first coil, and a control end connected with the control circuit;

the second switch transistor has a first end connected with the second end of the first switch transistor, a second end configured to connect to ground, and a control end connected with the control circuit; and the first coil has a second end configured to connect to ground.

14. The charging circuit of claim 12, wherein the first circuit comprises a full-bridge circuit and a control circuit controlling the full-bridge circuit, and the full-bridge circuit comprises a first switch transistor, a second switch transistor, a third switch transistor, and a fourth switch transistor, wherein the first switch transistor has a first end configured to connect with the charging interface, a second end connected with a second end of the first coil, and a control end connected with the control circuit;

the second switch transistor has a first end connected with the second end of the first switch transistor, a second end configured to connect to ground, and a control end connected with the control circuit;

the third switch transistor has a first end configured to connect with the charging interface, a second end connected with a first end of the first coil, and a control end connected with the control circuit; and the fourth switch transistor has a first end connected with the second end of the third switch transistor, a second end configured to connect to ground, and a control end connected with the control circuit.

15. The charging circuit of claim 12, wherein the first circuit comprises a switch transistor and a control circuit controlling the switch transistor;

the switch transistor has a first end configured to connect with the charging interface, a second end connected with a first end of the first coil, and a control end connected with the control circuit; and the first coil has a second end configured to connect to ground.

* * * * *